United States Patent
Smith

(10) Patent No.: US 8,952,815 B2
(45) Date of Patent: *Feb. 10, 2015

(54) ARRAY ANTENNA SYSTEM AND ALGORITHM APPLICABLE TO RFID READERS

(71) Applicant: Mark H. Smith, Alpharetta, GA (US)

(72) Inventor: Mark H. Smith, Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/085,294

(22) Filed: Nov. 20, 2013

(65) Prior Publication Data

US 2014/0076972 A1    Mar. 20, 2014

Related U.S. Application Data

(63) Continuation of application No. 12/363,555, filed on Jan. 30, 2009, now Pat. No. 8,593,283.

(60) Provisional application No. 61/062,998, filed on Jan. 30, 2008.

(51) Int. Cl.
*G08B 13/14* (2006.01)
*G06K 7/10* (2006.01)
*H01Q 3/00* (2006.01)
(Continued)

(52) U.S. Cl.
CPC ............. *G06K 7/10158* (2013.01); *H01Q 3/00* (2013.01); *H04B 5/0062* (2013.01); *H04B 5/02* (2013.01); *H04B 7/0615* (2013.01);
(Continued)

(58) Field of Classification Search
CPC ............ H04W 4/00; G01S 1/00; G01S 13/66; G01S 17/026; H04B 5/00
USPC .................... 340/572.1–572.9; 235/375–385; 343/844, 893
See application file for complete search history.

(56) References Cited

U.S. PATENT DOCUMENTS 5,977,913 A * 11/1999 Christ ........................... 342/465
6,034,641 A    3/2000 Kudoh et al.
(Continued)

FOREIGN PATENT DOCUMENTS

EP    1 835 435    9/2007
EP    1 772 814    11/2007
(Continued)

OTHER PUBLICATIONS

RF Controls, LLC, "Bidirectional Electronically Steerable Phased Array Antennas for Passive UHF RFID Systems: An Explanatory White Paper," Jan. 2009, USA.

*Primary Examiner* — George Bugg
*Assistant Examiner* — Edny Labbees
(74) *Attorney, Agent, or Firm* — Saliwanchik, Lloyd & Eisenschenk

(57) ABSTRACT

Embodiments of the invention pertain to Radio Frequency Identification (RFID) method and system using an antenna array, an array controller, and control algorithms. Embodiments of the invention can induce strong radio-frequency (RF) excitation, for a given level of radiated RF power, at any point within an arbitrary inhomogeneous medium. For RFID applications, one typical inhomogeneous medium is an ensemble of cases on a pallet. Another typical medium is a warehouse environment having stored goods together with shelving and other material present. An embodiment of the invention is applicable to the process of reading battery-less, or "passive" RFID tags, which rely on incident RF electromagnetic fields established by RFID readers to power the electronic circuitry within the tags.

31 Claims, 6 Drawing Sheets

(51) Int. Cl.
   *H04B 5/00*      (2006.01)
   *H04B 5/02*      (2006.01)
   *H04B 7/06*      (2006.01)
   *H04B 7/08*      (2006.01)
   *H01Q 1/22*      (2006.01)
   *H01Q 3/30*      (2006.01)
   *H04B 7/10*      (2006.01)

(52) U.S. Cl.
   CPC .......... *H04B 7/0842* (2013.01); *H01Q 1/2216* (2013.01); *H01Q 3/30* (2013.01); *H04B 7/10* (2013.01)
   USPC .................. 340/572.7; 343/844; 235/385

(56) References Cited

U.S. PATENT DOCUMENTS

| | | |
|---|---|---|
| 6,289,209 B1 * | 9/2001 | Wood, Jr. .................. 455/277.1 |
| 2005/0110641 A1 | 5/2005 | Mendolia et al. |
| 2007/0222608 A1 | 9/2007 | Maniwa |
| 2007/0279277 A1 * | 12/2007 | Kuramoto et al. ............ 342/147 |
| 2008/0012710 A1 | 1/2008 | Sadr |
| 2008/0231420 A1 * | 9/2008 | Koyama et al. .............. 340/10.1 |

FOREIGN PATENT DOCUMENTS

| | | |
|---|---|---|
| JP | 10093321 A | 4/1998 |
| KR | 10-20070094425 A | 9/2007 |
| WO | WO-2007-104339 A1 | 9/2007 |

* cited by examiner

ARRAY ANTENNA SYSTEM AND ALGORITHM APPLICABLE TO RFID READERS

CROSS REFERENCE TO RELATED APPLICATIONS

The present application is a continuation of U.S. patent application Ser. No. 12/363,555, filed Jan. 30, 2009, which claims the benefit of U.S. Provisional Application Ser. No. 61/062,998, filed Jan. 30, 2008, both of which are hereby incorporated by reference herein in their entirety, including any figures, tables, or drawings.

BACKGROUND OF INVENTION

Battery-less tags, by virtue of their potentially ultra-low cost and essentially unlimited shelf life, are important components for a broad class of important RFID applications. When an RFID inventory-tracking scheme requires every case or item within the purview of an inventory-control system to be tagged, which is the typical case for retail-distribution applications, battery-powered tags are generally considered cost-prohibitive, and battery-less tags are most often the only viable choice. When long-term storage of tagged items is involved, such as in a physical records archive managed with RFID technology, the finite shelf-life of batteries is an additional strong motivator for the use of battery-less tags.

Despite significant advances made in recent years in battery-less RFID tag technology, the adoption of this technology has significantly lagged the original expectations for RFID technology. An important impediment to more widespread adoption and utilization of battery-less RFID technology is the poor performance that is still frequently experienced when tags are on or near items that contain or comprise materials that interact strongly with RF propagation. Such materials include metal, dielectrics and lossy dielectrics that reflect, refract or attenuate RF energy incident on them or passing through them. Cans, foils, liquids, gels, dense powders, produce, meat and dairy products are just a few examples among numerous items that can severely impair the RF coupling between a reader and a tag.

Severe attenuation of a signal propagating from an RFID reader to a battery-less RFID tag is particularly problematic. The RF electromagnetic field strength required to operate a battery-less RFID tag is significantly higher than that required to communicate to an electronic receiver having an independent power supply such as a battery. Active electronic circuitry, powered by a battery or other power source, can indeed detect, decode and otherwise process extremely weak signals. A battery-less RFID tag, however, cannot operate such electronic circuitry until the tag has extracted sufficient energy from the RF electromagnetic field supplied by the reader or another external source. The incident RF field level required to provide operating power for the electronic circuitry is far greater than that required to communicate with already-powered circuits. The frequent difficulty in achieving the necessary incident RF field strength in the presence of material configurations with adverse RF propagation characteristics, while still satisfying regulatory constraints on radiated RF power levels, is an important technical obstacle currently preventing far more widespread adoption of battery-less RFID technology.

In prior applications of antenna arrays, there are typically only one or two degrees of freedom exploited, corresponding to elevation and azimuth angles for the far-field radiation pattern. In relatively rare applications, multiple beams might be formed, or radiation might be focused at a finite distance rather than at infinity, whereas far-field patterns are essentially "focused at infinity". Even in such relatively exotic applications, however, the degrees of freedom utilized are far less than the total degrees of freedom inherently available with independent control of individual antenna elements.

Prior applications of array technology are characterized by one or more of the following:

The medium is homogeneous, such as free space, or sufficiently close to homogeneous such that a homogeneous medium is assumed for the control of the array;

The medium differs from a homogeneous one by a constant, known factor, such as a protective radome, a supporting structure that interacts with the array, a ground plane or approximate ground plane, or a nearby half-space filled with a different homogeneous or approximately homogeneous medium;

The medium is sufficiently inhomogeneous to affect the propagation in a potentially adverse way, as exemplified by an environment containing walls, trees or other structures, but the antenna system makes no adjustments specific to the particular configuration of this surrounding material, other than possibly an adjustment in its angular sensitivity, e.g., pointing direction;

The array does make adjustments that mitigate the effects of adverse propagation characteristics such as multipath, but requires the presence of a signal originating from the intended focal point in order to adapt the array settings, as is the case for a "rake receiver;"

The array makes adjustments that peak its response to a signal emanating from an unknown location, but requires the presence of a signal emanating from that location, and particular to it (different in some way from similar signals that may be emanating from other locations), in order to adapt the array settings, as in the case of adapting the array to a transponder or modulator with a self-contained power source;

The array makes adjustments that mitigate for unwanted signals, in which case there is by definition a signal originating from the location or direction of the intended null in the array antenna pattern.

BRIEF SUMMARY

Embodiments of the invention pertain to Radio Frequency Identification (RFID) method and system using an antenna array, an array controller, and control algorithms. Embodiments of the invention can induce strong radio-frequency (RF) excitation, for a given level of radiated RF power, at any point within an arbitrary inhomogeneous medium. For RFID applications, one typical inhomogeneous medium is an ensemble of cases on a pallet. Another typical medium is a warehouse environment having stored goods together with shelving and other material present. An embodiment of the invention is applicable to the process of reading battery-less, or "passive" RFID tags, which rely on incident RF electromagnetic fields established by RFID readers to power the electronic circuitry within the tags.

DETAILED DISCLOSURE

Embodiments of the invention can enable the achievement of sufficient incident RF field strength in the presence of material configurations with adverse RF propagation characteristics, as well as enhance the performance of other systems and devices. Embodiments of the invention incorporate an array of antenna elements, with an array controller that independently controls the various transfer functions between a common RF input/output port and the various antenna elements. Embodiments can also utilize one or more algorithms for arriving at one or more suitable sets of transfer functions for the various element signal paths. Embodiments utilize control algorithms that do not require advance knowledge of the propagation characteristics of the media surrounding a given point of interest. Additional embodiments can utilize advance knowledge of some measurable properties that depend on propagation characteristics to increase the effectiveness of the system.

Figure 1:
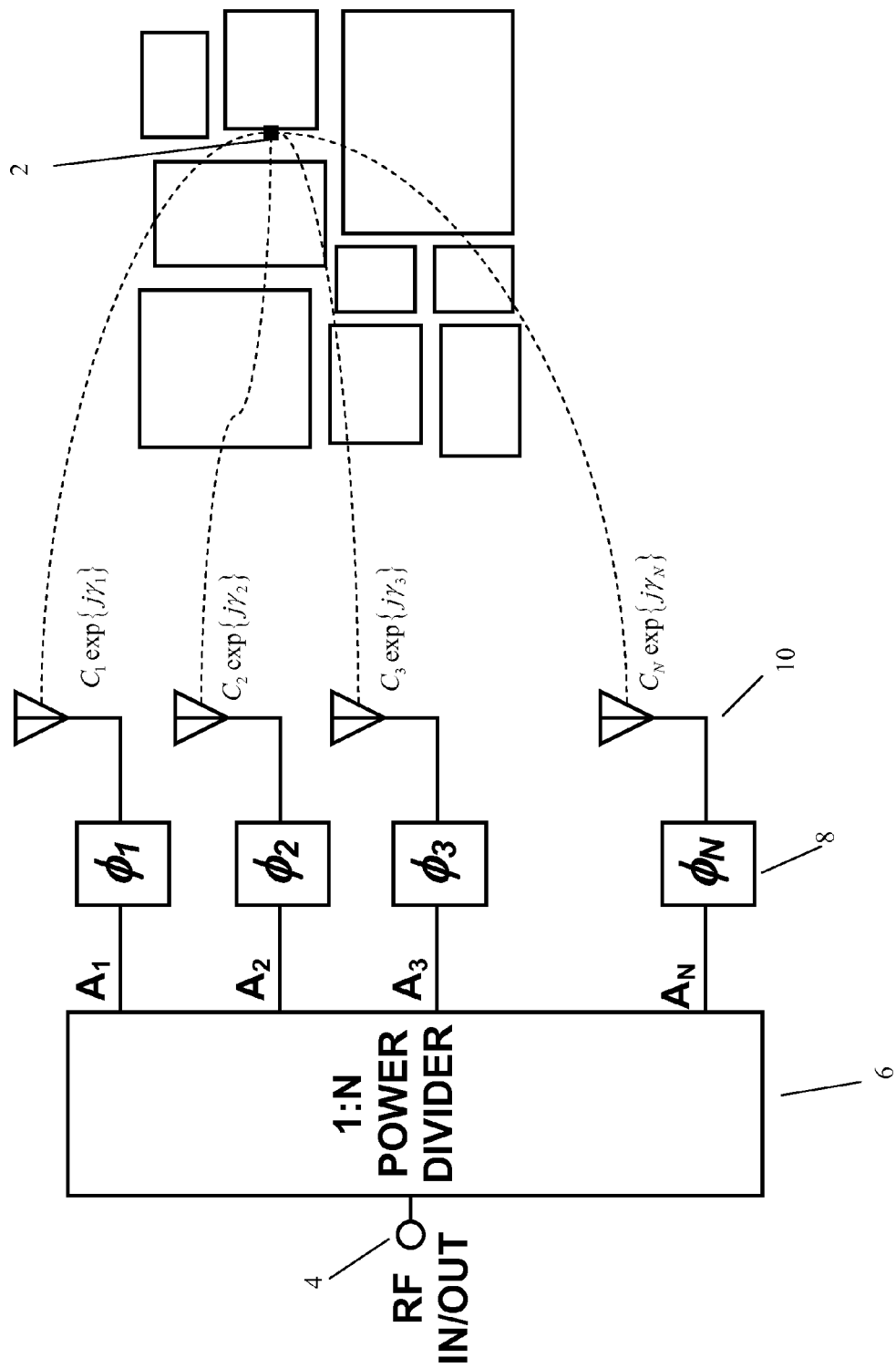
FIG. 1 shows a top-level schematic diagram of the antenna array, along with a representation of an RFID tag located within an ensemble of boxes according to embodiments of the subject invention.

FIG. 1 shows a top-level schematic diagram of an antenna array in accordance with an embodiment of the invention, along with a representation of an RFID tag 2 located within an ensemble of boxes. A single RF input/output port 4 is coupled to multiple array channels through a 1:N power divider. The 1: N power divider can also function for the opposite propagation direction (the "receive" direction) as an N:1 power combiner. Each of the enumerated ports is coupled through an electronically controllable variable phase shifter (or variable delay line) 8 to its respective antenna element 10. The phase shift may also be in inherent function of the power divider network, or may be partly derived from the inherent function of the power divider network. The various antenna elements can be characterized by different phase-center locations, different radiation patterns, and/or different polarizations, or different combinations of these attributes.

The power divider can be fixed, or can be variable. In this way, the amplitudes $A_1, A_2, A_3, \ldots A_n$ indicated at each of the N enumerated ports can be fixed, or can be electronically controllable to achieve variable power distributions within the constraint of the total available input power. The power divider can be nominally lossless, with the total transmit power delivered to the antenna elements differing from the input power at the RF port only by the amount of power dissipated in unintended insertion loss. Alternatively, the power divider can incorporate attenuation in its mechanism for setting the output amplitudes. The power distribution mechanism can also use a space-feed configuration, wherein one illumination antenna conveys power to the various array elements, which then apply their local control functions and re-transmit the signal into to the volume of interest.

As an alternative to a power distribution function, various means can be used to reconstruct the input signal at each array element, including digital sampling and reconstruction. In the case of digital sampling and reconstruction, control functions such as phase and amplitude control can be accomplished numerically in the digital domain before reconstructing the RF signal.

The amplitudes established for the transmitted signals at the various antenna elements of the array are denoted by the $A_n$, where amplitude $A_n$ is defined here as the square root of the power delivered to the antenna terminals of array element n. The phases of these transmitted signals, relative to the input signal at the RF input/output port, are denoted by the $\phi_n$.

Propagation channels from the various antenna elements to an RFID tag's antenna terminals are denoted in FIG. 1 with dashed lines. In general, for a tag in the vicinity of RF-interactive materials, the coupling between an antenna element and the tag is a complicated phenomenon. However, though it is very difficult to calculate or predict analytically, the coupling at any given RF frequency can be characterized by a pair of parameters, namely, the amplitude, denoted by $C_n$, and phase angle, denoted by $\gamma_n$, of the RF voltage developed at the tag's antenna terminals when an excitation of unit voltage and zero phase angle is applied to the terminals of antenna element. Thus, each propagation channel indicated in FIG. 1 can be characterized at a particular frequency by the complex expression, $C_n \exp\{j\gamma_n\}$, which represents the complex steady-state transfer function at that frequency between the array element antenna terminals and the RF tag antenna terminals.

The RF voltage, V, induced at the RFID tag antenna terminals for an arbitrary combination of array element amplitudes $A_n$ and element phases $\phi_n$ is given by $$V = \text{Re}\left\{\sum_{n=1}^{N} A_n \exp\{j\phi_n\} C_n \exp\{j\gamma_n\}\right\} \quad (1)$$

$$= \sum_{n=1}^{N} A_n C_n \cos(\phi_n + \gamma_n)$$

The sum of the individual transmit powers transmitted to the array antenna element terminals can be constrained to equal some value $P_0$:

$$\sum_{n=1}^{N} A_n^2 = P_0 \quad (2)$$

If attenuators are used as part of the amplitude-setting mechanism in the power divider, the input power can be adjusted to overcome the attenuator loss and maintain the overall power constraint. In general, an approach using attenuators to set the amplitudes will not optimize the induced voltage at the antenna terminals of an RFID tag for a given array input power applied to the RF port, but with adjustable array input power an approach using attenuators can optimize the induced voltage for a given total transmitted power, $P_0$.

The phases, $\phi_n$, of the array elements have no effect on the constraint of Equation (2). Therefore, for any given distribution of array amplitudes, $A_n$, the tag voltage, V, can be maximized over all possible $\phi_n$ without accounting for this constraint. A condition for a local maximum or minimum of V over all possible $\phi_n$ is that the gradient of Equation (1) with respect to the $\phi_n$ be zero. This gradient is zero when $\sin(\phi_n + \gamma_n)=0$ for all n. For each n, two unique solutions for that $\phi_n$ are possible, corresponding to $\cos(\phi_n + \gamma_n)=\pm 1$. Since the $A_n$ and $C_n$ are all positive, real values, the sum can be maximized by choosing $\cos(\phi_n + \gamma_n)=1$ for all n. This yields $$\phi_n = -\gamma_n, \forall n \quad (3)$$

For any set of array element amplitudes, $A_n$, this condition on the element phases yields the maximum possible terminal voltage, V, for that set of amplitudes.

Given the condition of Equation (3) for the phases, the tag terminal voltage of Equation (1) becomes $$V = \sum_{n=1}^{N} A_n C_n \qquad (4)$$

The tag terminal voltage of Equation (4) can be optimized subject to the constraint of Equation (2) using the method of Lagrange multipliers. To apply this method, the gradient with respect to the $A_n$ of $P_0$ as given in Equation (2) is set equal to some constant, $\lambda$, times the gradient of V as given in Equation (4). This yields $$2A_n = \lambda C_n, \forall n \qquad (5)$$

Solving Equation (5) for $A_n$ and substituting the result into the constraint of Equation (2) yields $$\lambda = 2\sqrt{\frac{P_0}{\sum_{n=1}^{N} C_n^2}} \qquad (6)$$

The optimum amplitudes, given the condition of Equation (3) on the phases, are then given by $$A_n = \sqrt{\frac{P_0}{\sum_{n=1}^{N} C_n^2}} C_n \qquad (7)$$

Accordingly, for any amplitude distribution established by the power divider, there exists a unique set of phases, $\phi_n$, that optimizes (maximizes) the voltage induced at the antenna terminals of a particular RFID tag within the field of view of the array. Furthermore, when the amplitudes of the power divider can be adjusted, subject to a constant transmitted power constraint as in Equation (2), there exists a unique set of power-divider amplitudes that further optimizes this induced voltage.

The propagation channel characteristics given by the $C_n$ and $\gamma_n$ are typically not known, so the array element weights defined by the $A_n$ and $\phi_n$ are difficult to calculate, or cannot be calculated, in practice. However, a rational search algorithm can be defined so that the antenna array state can achieve an optimal setting or a sufficiently effective setting, for any location and polarization within the read volume. This approach is very amenable to the RFID application, as RFID readers typically execute numerous read cycles for a given population of tags, providing numerous opportunities to cycle through different array states in order to arrive at an effective array state for each tag in the population.

The array state can be parameterized by the phase, and optimally amplitude, of the transmitted signals at each antenna element. In general, when the individual antenna elements have fixed characteristics, and the array controller only adjusts phase, or phase and amplitude, of the excitations for each element, an N-element array has at most N−1 meaningful degrees of freedom for phase control. The phase of any one element can be arbitrarily established, and the resulting electromagnetic field intensity is dependent only on the relative phase differences of the remaining N−1 elements. When amplitude control is implemented, there are at most N−1 degrees of freedom for amplitude control if the power divider is nominally lossless, or if a total-power constraint such as Equation (2) is used, or if the input power is adjusted for each array state to achieve some defined constraint on field intensity. Combined phase-and-amplitude of all N elements independently can yield 2N−2 total degrees of freedom.

In an embodiment, the maximum definable degrees of freedom are not implemented in the RF hardware. In a specific embodiment, for example, a fixed power divider with no amplitude control can be used. Another embodiment can utilize variable power division between subsections of the array, such as sub-arrays with fixed power division within each sub-array. Furthermore, given the degrees of freedom that can be implemented with a given embodiment of RF hardware, it is not required to actually exercise all of them. An example would be a system utilizing digitally controlled phase shifters with B bits of control, inherently capable of $2^B$ states. In a specific embodiment of these $2^B$ states, only those approximating certain discrete phase angles, such as 0°, 120° and 240° might actually be utilized.

With respect to various embodiments of the invention, the subject method and apparatus can be used in applications having one or more of the following characteristics: the propagation characteristics of the medium are very likely to be highly inhomogeneous; there is insufficient advance knowledge of the details of the medium to design an adequately functional array excitation ahead of time; the inhomogeneous nature of the medium is highly likely to affect the propagation in a sufficiently adverse manner as to cause the application to fail if the adverse effects are not mitigated with a fairly high degree of specificity; no active signal sources or modulators at the desired focal points are available to assist the adaptation of the array for those locations; and effective utilization is made of array states that would be ineffective for many prior applications.

Figure 2:
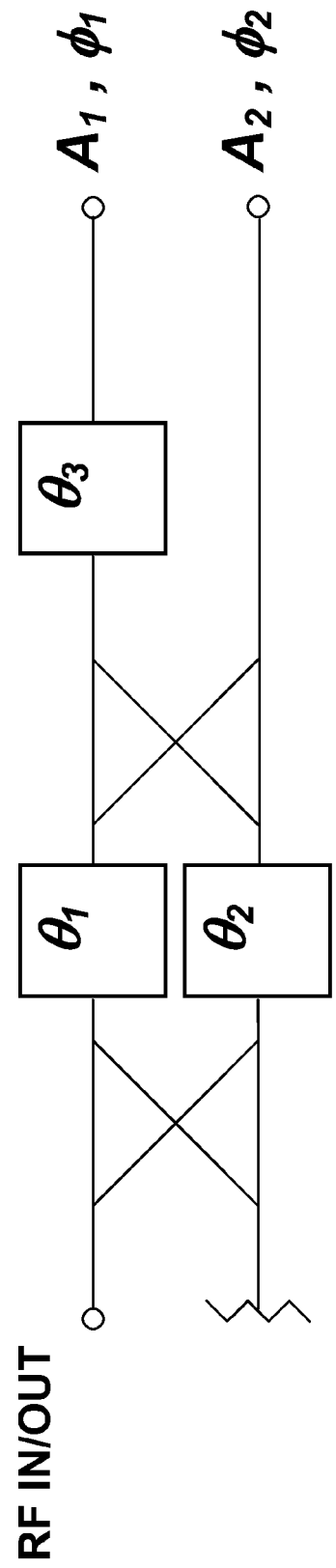
FIG. 2 shows a two-element array, controlled with a network of phase shifters and 90° hybrid couplers according to embodiments of the subject invention.

In specific embodiments, array states may be parameterized by the actual RF control-component settings rather than by the resultant phases or phases and amplitudes of the element excitations. The number of RF control components may exceed the useful degrees of freedom of the array state, in which case linear combinations of component settings may be identified to bring the degrees of freedom for component settings in line with the useful degrees of freedom for the array state. This can be illustrated with the simple example of a two-element array, controlled with a network of phase shifters and 90° hybrid couplers as shown in FIG. 2. The amplitudes and phases of the two antenna ports are given by $$\begin{aligned} A_1 &= \sin\left(\frac{\theta_1 - \theta_2}{2}\right) \\ \phi_1 &= \frac{180° + \theta_1 + \theta_2}{2} + \theta_3 \\ A_2 &= \cos\left(\frac{\theta_1 - \theta_2}{2}\right) \\ \phi_2 &= \frac{180° + \theta_1 + \theta_2}{2} \end{aligned} \qquad (8)$$

For this simplified example there are only two useful degrees of freedom, namely, the amplitude split between the ports and the phase difference between them. To define array state parameters in terms of component settings, a linear combination of $\theta_1$ and $\theta_2$ could be defined:

$$\Delta\theta = \theta_1 - \theta_2 \qquad (9)$$

The two component parameters, $\Delta\theta$ and $\theta_3$, are sufficient to span the useful degrees of freedom for the array states.

In an embodiment, linear combinations of parameters may also be used for other reasons, such as increased convenience in categorizing states, and potentially eliminating some states so as to reduce the search space. For example, consider a rectangular array of antenna elements with $N_1$ rows and $N_2$ columns, containing $N_1 \times N_2$ elements. With combined phase and amplitude control of these elements, there are $2 \times N_1 \times N_2 - 2$ meaningful degrees of freedom. However, element excitations could be defined in terms of spatial frequency across the array. At some point, higher spatial frequencies would yield field configurations more and more evanescent in character, i.e., characterized by non-propagating, stored-energy fields with amplitudes decreasing exponentially with increased distance from the array. While some evanescent field configurations will actually couple to useful propagating modes within a highly inhomogeneous medium, the array states with the highest spatial frequency of the illumination may be found for a given application to add no real utility. Parameterizing the array states in this way would facilitate the definition of a subspace of useful array states.

In a specific embodiment, digitally controlled components are utilized to control the array state, such that discrete states in the parameter search space are defined by available states of the components. For example, if phase shifters (or switched delay-lines) with two-bit digital control are utilized, then each phase shifter has four available states. For N-1 phase values in the parameter search space (corresponding to N array elements), there would be $4^{N-1}$ unique combinations of phase commands for the N-1 phase shifters. The entire parameter state space in this case could be represented by a single digital word with $2 \times (N-1)$ bits. Incrementing this word through all $4^{N-1}$ possible digital values would effectively yield an exhaustive search, subject to the control component resolution, through the entire parameter search volume, necessarily passing through the best available state for every location and polarization within the read volume.

In further embodiments, some or all of the control components can be capable of continuously variable states, rather than discretely variably states. For example, voltage-controlled phase shifters can be utilized. Such components can be controlled with analog voltages that are in turn generated digitally, thus rendering discrete states. Alternatively, analog control voltages can be generated to sweep these components through their states. To accomplish this, minimum-shift intervals would be defined within the continuum associated with each such component. Each minimum-shift interval can define a relatively small interval of values to which a control device can be constrained as other control components are swept through their full range of values. That is, each minimum-shift interval can approximate a constant component setting. For example, if voltage-controlled phase shifters are controlled with sawtooth voltage waveforms, then the slowest sawtooth waveform moves its phase shifter through one minimum-shift interval while the next slowest sawtooth waveform moves through its full range. Similarly, this second-slowest sawtooth moves its phase shifter through only one minimum-shift interval while the third-slowest sawtooth moves through its entire range. In the time required for the slowest sawtooth waveform to pass through its full voltage range, the full set of N-1 sawtooth waveforms can effectively execute a raster scan of the parameter search volume, with a resolution defined by the minimum-shift intervals, necessarily passing through the best available state for every location and polarization within the read volume.

Stepping the array through every available state in a methodical fashion may be a tractable approach, particularly in cases where there is a limited number of array elements and a limited number of control states for each element, or in cases where the time required to execute the search is not as critical as it may be in applications involving rapid movement of goods. An example of the latter case might be an electronic inventory conducted of an entire warehouse, where one complete inventory process accomplished in a single evening represents an enormous improvement over manual inventory processes. For more time-critical applications, however, utilizing a relatively large number of array elements and/or a relatively large number of control bits for each element, it may be useful to modify the search process.

In an embodiment, the search states can be ordered so as to increase the probability of satisfying the incident-field requirements for every location (e.g., for every tag) relatively early in the search process. If the search process can be terminated upon obtaining a specified result, such preferential ordering of states can significantly speed the inventory process. In RFID applications, a list of tags that should be found in an ensemble is often available in a database accessible by the reader. The search process can be terminated once all tags in the list are found, thus eliminating the use of subsequent array states. In many applications this would provide an acceptable level of inventory control. In another embodiment, the parameter search volume can be restricted in some way, so that the total set of possible array states is not implemented in any search.

The parameters for modified search processes may be based on laboratory data, data from actual operation in the field, computer simulation or other analyses, or a combination of these sources. Modified search parameters may be set at the factory during manufacture of the array system based on currently available data for the intended application. Alternatively, or in addition, modified search parameters may be continuously or periodically updated based on data accumulated during actual operation within the specific operating environment for a given array system, or possibly from similar operating environments within the same enterprise or across a set of cooperative enterprises.

In an embodiment, the available states can be ordered by cycling through coarse states first, then increasingly fine states. For example, if three-bit phase shifters are utilized, a search pattern can be constructed for one-bit phase shifters. A second search pattern can include all possible states with two-bit resolution, with any duplicate array states, already encountered in the one-bit search pattern, deleted from the new pattern. Another search pattern through all possible states with three-bit resolution can then be performed, with states already encountered in the one-bit and two-bit search patterns deleted from the new search. Sequencing through all three such search patterns in this "staged resolution" search pattern can achieve all array states available with three-bit resolution. However, for any given polarization at any given point, the voltage amplitude induced with the best available one-bit array state can be a significant percentage of the voltage induced with the best available two-bit array state, which in turn can be an even higher percentage of the voltage induced with the best available three-bit state. That is, there is a decreasing rate of return obtained from the increasingly higher-resolution states. Thus, only the most difficult cases require the peak performance achieved in the latter stages of the complete search. This increases the likelihood that a search can be terminated before cycling through all available states.

Another way to formulate the "staged resolution" search pattern just described is to define a binary number with Nbits×(N−1) bits, where Nbits is the number of bits of resolution for one control device, and N is the number of control elements.

The lowest-order N−1 bits (capable of representing binary numbers from 0 to $2^{N-1}-1$) represent the most-significant bit for each of the N−1 control devices (for example, the 180° bits for all the phase shifters). The next N−1 bits in the binary number represent the next-most-significant bit for each control device (for example, the 90° bit for all the phase shifters), and so on. Starting this binary number at zero and incrementing it by ones until all states are achieved results in the staged resolution search pattern.

A second method for ordering the search states is to use prior knowledge of particularly effective array states to define a set of preferred array states for a given application. In an RFID application, this prior knowledge may pertain to a specific ensemble of tags, to a relatively narrow category of ensembles typical for a particular RFID application, or a wide variety of ensembles typical for a particular RFID application. The knowledge may be based on a particular RFID reader installation with a particular array configuration and operational algorithm, or may be derived from data pooled from a number of RFID readers.

Knowledge of particularly effective array states for RFID applications can be acquired by simply counting the number of unique tags successfully read with each array state as a read process progresses. Those states for which any tag was successfully read can simply be rank ordered, in descending order according to the number of tags successfully read. This data can either be used directly in that form to prioritize array states, or may be processed to give higher scores to states that successfully read tags not read with other array states. The data can also be more intensively processed, so as to derive a minimal set of array states that would have achieved all of the successful reads based on the available data.

Preferred array states for a given RFID application may be derived from a specific configuration of a particular ensemble of tags, such as the tags associated with a particular shipment of cases in a fixed configuration on a pallet. In this case, the preferred ordering of states can be stored in a database accessible to RFID readers that may subsequently process the same ensemble configuration. If the identity of the ensemble is not already known by other means, database functions can be utilized to associate a single item within an ensemble with the particular ensemble within which it should be found, enabling database entries for the appropriate ensemble to be accessed. The preferred ordering of states could be one of the data items associated with that ensemble.

Preferred array states for an RIFD application may pertain to a relatively narrow category of tag ensembles. Ensembles may be categorized by vendor, product type or packaging mode, specific combinations of these or similar attributes, or by any categorization determined to correlate with different effective array states. Given a list of items that should be contained within a particular ensemble, the proper category can be inferred using various database functions to operate on the list.

Preferred array states for an RFID application may be defined for broad categories of tag ensembles. For example, data may be accumulated from all read processes over an extended period of time from a large population of readers and processed to form preferred states based on the entire aggregate of data. In this case the broad category includes all ensembles that have been processed by the readers involved over the extended period of time.

Preferred states for either narrow or broad categories of tag ensembles may be derived from multiple array antenna systems with similar element configurations, or from a single array system. Without recourse to data from any database or other reader, the controller associated with a single array system could maintain a running total of the number of successful reads for each available array state, and a corresponding ordered list of preferred array states. With access to a database containing information about specific items associated with the tags it reads, the controller associated with a single array can also develop and maintain separate lists of preferred array states for various categories of tag ensembles. Alternatively, read performance as a function of array state can be compiled for a number of similar array systems in similar RFID applications, and the aggregate data processed for preferred states.

For a particular RFID application or category of applications, it may be found that some array states are essentially unnecessary, in that they rarely or never provide effective excitations that are not achieved by other states. For example, depending on array element spacing and location, certain combinations of element phases may yield highly evanescent fields that essentially die off before illuminating any useful portion of the read volume. In the ordered search approach discussed above, such states would necessarily be at the very end of the list. In more time-critical applications, they can be eliminated altogether from the search list, and other remedies arranged for situations where one or more expected tags were not found while using the preferred array states on the list.

As another possibility, it may be determined for certain RFID applications that the performance of a certain subset of array elements compliments the performance of another subset of elements, so that the simultaneous combination of the two subsets is not necessary to achieve the required overall performance. An example of this situation might be observed with the division of the overall array into multiple sub-arrays. It may be determined that with sufficiently high probability any tag encountered in the application will be successfully read by one sub-array or another operating by itself, in which case the exhaustive set of all possible combinations of simultaneous settings for the multiple sub-arrays would not be required. Rather, each sub-array in such a set would be activated in isolation, with the other sub-arrays set to zero amplitude, thus substantially reducing the dimensionality of the parameter search volume. For example, individual sub-arrays placed on each side of the inventory volume, or on each side and above the volume, might be operated in this fashion.

Yet another situation in which the parameter search volume may be restricted would arise when the illumination patterns of different sub-arrays are independent, and essentially do not interact. In this case, the array states of all such sub-arrays can be searched simultaneously, using for each sub-array a list of preferred states associated with that particular sub-array. The total dimensionality of this search volume can correspond to that of one of the sub-arrays in isolation (i.e., a sub-array with a preferred list representing the largest dimensionality among those of all of the sub-arrays).

When a total power constraint such as Equation (2) is used, the value of $P_0$ can be chosen to guarantee that regardless of what state the array is set to, the radiated power will not exceed certain limits, such as regulatory limits. However, this may be an excessively restrictive constraint. Depending on the settings of the various antenna elements, the resulting electromagnetic fields may be partly evanescent in nature. Evanescent fields are characterized by significant stored electromagnetic energy in the vicinity of the array—which energy may be utilized by RFID tags for operating power—and less propagated energy than would be obtained with the same RF input power and different (more conventional) array settings.

Compliance with regulatory constraints is in general more dependent on propagated-energy fields than on stored-energy fields. Thus, when an array state results in a lower level of propagated fields for a given input power, it is generally possible to increase the input power to the array and still maintain compliance with the applicable regulations. In this way, stored-energy field components that may have significant utility for illuminating RFID tags can be made even more effective, while still satisfying regulatory constraints on radiated power.

For a given configuration of antenna elements and given array state established by the controller, the worst-case electromagnetic field intensity in the far field can be estimated with calculations or computer simulation, or measured in a laboratory setting for a representative set of material configurations. This data can be used to set different power levels for each array state so as to maintain the maximum possible excitation fields consistent with applicable regulatory constraints. Alternatively, the actual far-field intensity can be actively monitored, and the results used for real-time adjustment of transmitted power for the same objective.

The far-field intensity from the system for a given input power level depends on both the array system and on the material it illuminates. Given an infinite set of possibilities for the material (e.g., contents and arrangement of cases on a pallet), it is obviously impossible to exhaustively calculate or measure the far-field intensity for all possible material configurations. However, highly contrived material configurations can be postulated, designed to explore the probabilities of far-field coherence of different scattered field components. For example, boxes can be constructed or covered with good electrical conductors, and sized and positioned to correspond to the individual antenna elements in the array. By adjusting the displacement between each such box and the antenna element to which it corresponds, the phase of its contribution to the far field can be varied. From calculations or measurements using these contrived material configurations, a statistically sound upper bound on far-field intensities can be projected for each array state in a given array configuration. This information can be used directly to set the input power for each array state, or to help position auxiliary receive antennas for sensing the far-field electromagnetic field intensity in real time. When real-time sensing of field intensities is used, the projected upper bound can be used to establish the initial power level, which can then be increased to a maximum legal level based on the real-time measurement.

Preferably, array states can be switched in coordination with the reader. The criterion for changing array state can be based on the rate at which new tags are being identified within the field of view. Given the elapse of a pre-specified interval of time without the identification of a new tag, the array state can change to the next state in the list. Many RFID reader systems already contain logic to cycle through multiple antennas; a different array state can simply be considered a different antenna, though utilizing the same physical input port. A simple modification may be made to an existing reader or reader-controller so that a change of antenna in its usual scanning sequence, whatever criterion is used by the controller for changing antennas, can be executed without physically changing the RF port utilized by the reader. The presence of the array antenna system essentially presents the reader controller with a new degree of freedom to be exercised in the reader programming.

Another approach useful for more easily achieving back-compatibility with existing readers is to accept multiple input ports from the reader, which ports appear to the reader to be independent antenna ports. Each time the reader changes antenna ports, this is detected by the array system, which immediately transitions the array to the next state in the state list, and connects the detected port to the actual array input.

Back-compatibility with existing readers can also be obtained by incorporating a receiver-processor into the array system to monitor the RFID reader's transmissions. By monitoring and detecting features such as burst durations, signal gaps and frequency hops, the status of the reader within its read cycles can be ascertained, and array state-transitions timed to avoid corruption of individual read cycles.

Timing of state transitions can also be assisted by monitoring the data-reporting function of the RFID reader. A computerized controller typically accepts output from the reader, and continuously updates a status list of all tags identified in the current query. This status may be displayed visually on a computer screen. With any of a variety of simple modifications to the programming of the controller, new tag reports can be detected and their frequency calculated; when the rate of new tag reads falls below some threshold, the array can be commanded to the next state.

Finally, though it may not represent an optimal approach in terms of performance, the array system can operate asynchronously with the reader, and simply cycle continuously through its available states on a pre-determined time line.

EXAMPLE EMBODIMENTS

Figure 3:
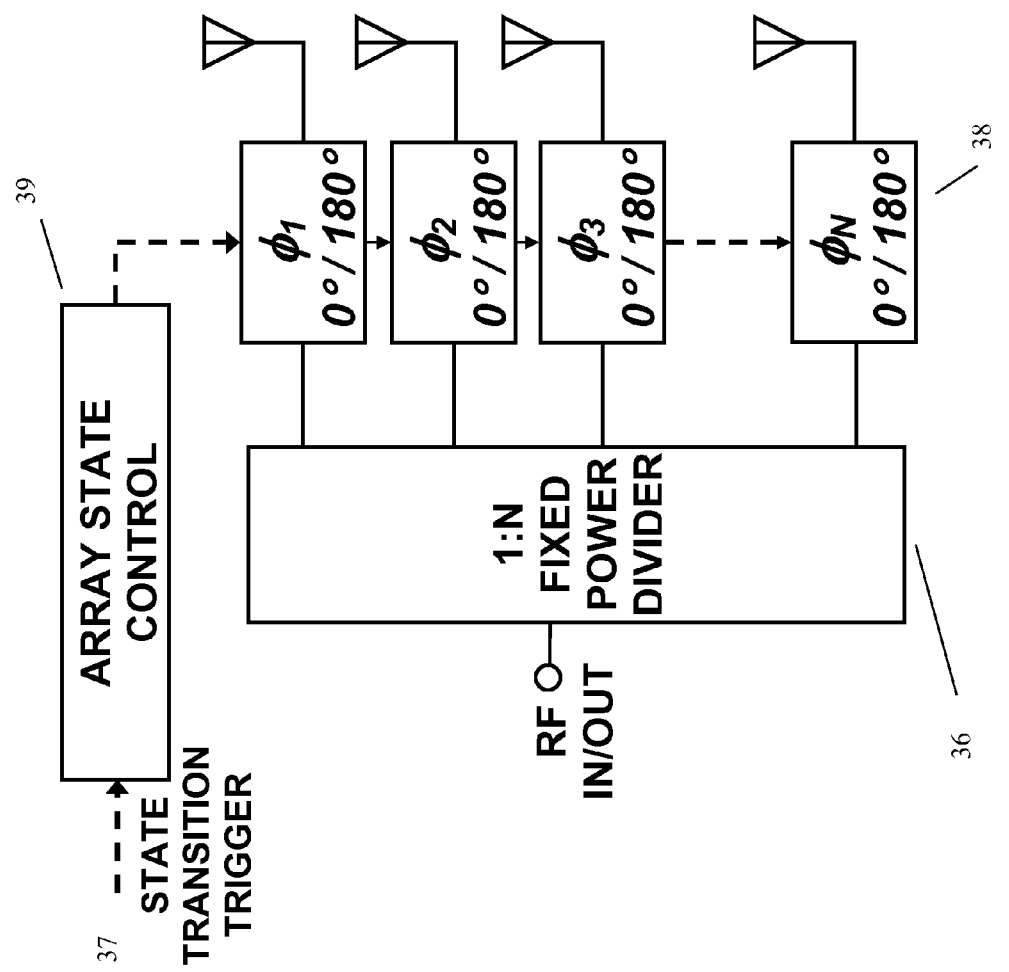
FIG. 3 shows an embodiment of the subject invention utilizing a fixed 1:N power divider, and a two-state (0°/180°) phase shifter for each array element.

FIG. 3 shows a simple embodiment of the invention, utilizing a fixed 1:N power divider 36, and a two-state (0°/180°) phase shifter 38 for each array element. Alternatively, the phase shifters can be approximated by switched-line elements, each having two available line lengths differing from each other by approximately one half wavelength at the center frequency of the operating band. The array state control block 39 can utilize a pre-stored list of array states, along with the necessary digital logic to convert each array state to phase shifter commands. Given a strobe signal at the state transition trigger input 37, the array can progress to the next state in the pre-stored list.

Figure 4:
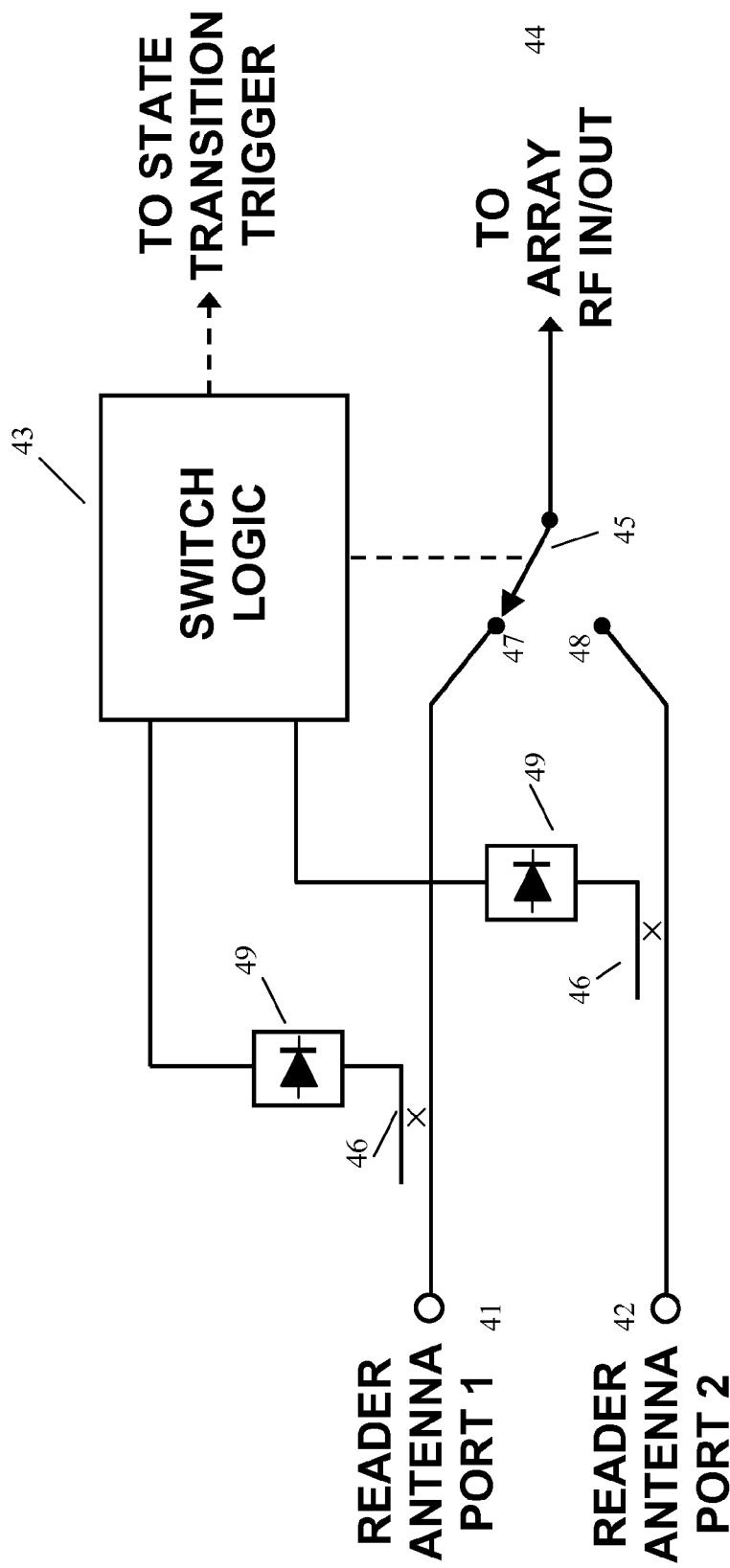
FIG. 4 shows an interface module which can be used to connect the subject invention with existing readers to allow the subject invention and existing readers to be compatible.

For compatibility with existing readers, such an embodiment can be connected with a reader through an interface module such as that shown in FIG. 4. This module can exploit existing logic in the reader for switching between two antenna ports 41, 42. Each of the two RF channels can be routed through a directional coupler 46, routing a small fraction of the incident RF power to a power detector 49, such as a microwave crystal detector. The video voltage output of the two detectors can be converted to voltage levels compatible with standard digital logic such as TTL, and submitted to a switch logic circuit 43. The switch logic circuit 43 can control an RF switch 45 selecting one of the two RF channels 47, 48 for the array RF In/Out port 44. The switch logic circuit 43 can monitor four logical variables:

P1=TRUE if incident power detected from Reader Antenna Port 1;
P2=TRUE if incident power detected from Reader Antenna Port 2;
S1=TRUE if RF switch is set to select Port 1;
S2=TRUE if RF switch is set to select Port 2;

Given these definitions, the logic for setting the RF switch can be summarized as follows:

$$S1 = P1 + \overline{S2}$$

$$S2 = P2 + \overline{S1} \tag{10}$$

The embodiment of FIG. 4 shows two reader antenna ports 41, 42; the concept is readily extendable to accommodate a greater number of reader antenna ports. For example, the logic for three ports can be summarized as following:

$$S1 = P1 + (\overline{S2} \cdot \overline{S3})$$

$$S2 = P2 + (\overline{S1} \cdot \overline{S3})$$

$$S3 = P3 + (\overline{S1} \cdot \overline{S2}) \tag{11}$$

As shown, the embodiment of FIG. 3 provides no means for externally initializing the array state to the first state in the state list. Thus, a preferred ordering of states can not be readily accommodated. However, the embodiment can be easily modified to automatically reset to the initial state in the list if no state changes are triggered for some predetermined duration of time. This function can reside, for example, in the array state control block.

Figure 5:
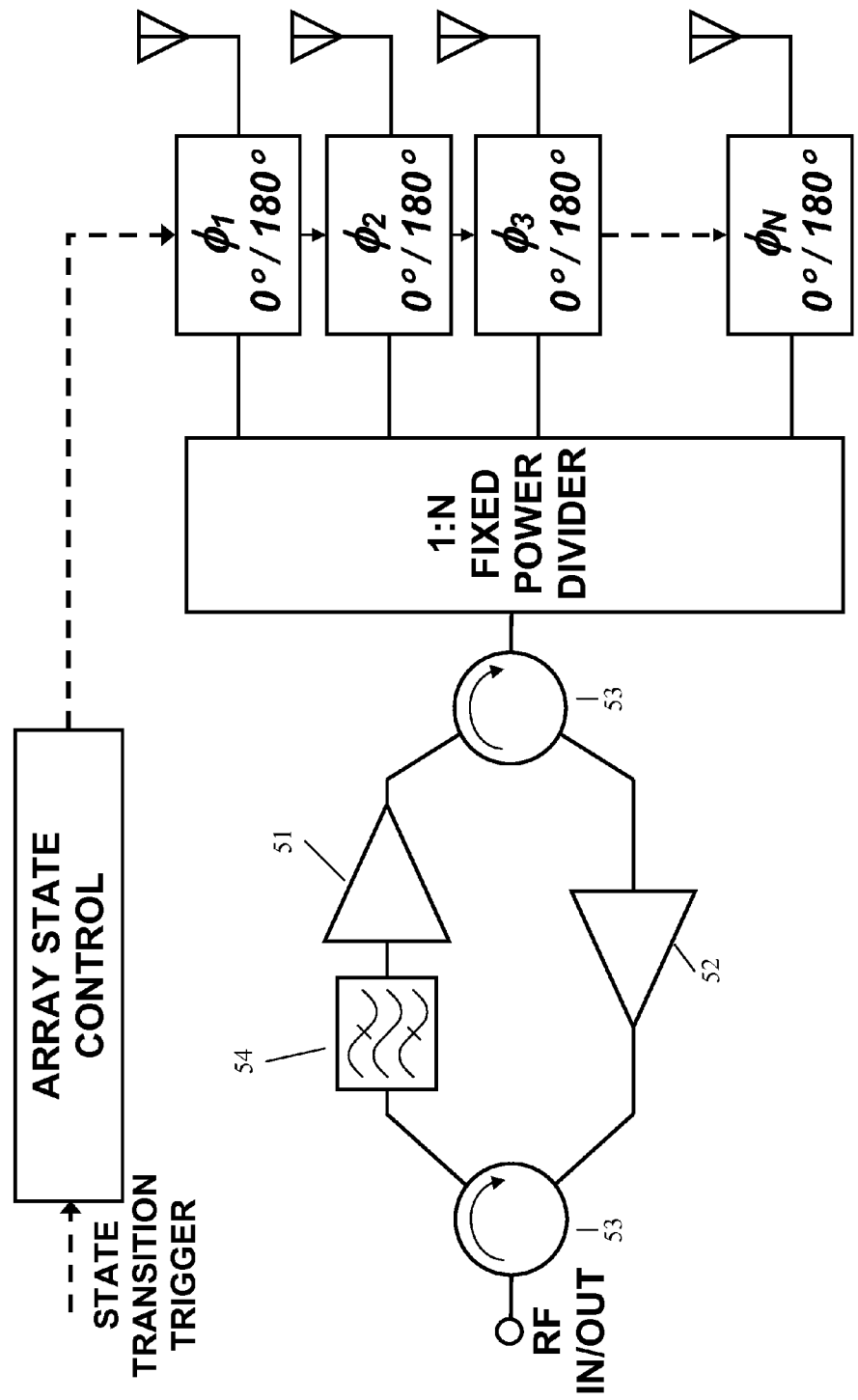
FIG. 5 shows a pair of RF amplifiers which can boost both the transmit and the receive signals according to embodiments of the subject invention.

Another embodiment, shown in FIG. 5, includes RF amplifiers 51, 52 to boost both the transmit and receive signals as necessary. The boosted power can compensate for additional dissipative loss incurred in the power divider and phase (or line-length) shifters; additionally, if the array states included in the pre-stored list permit a higher transmit power than that provided by a standard reader, the RF amplifier 51 in the transmit path can provide that additional power. If amplification in both the transmit and receive directions is used, the two propagation directions can be accommodated with circulators 53 as shown. If the circulator arrangement is used, then a filter 54 can be used to restrict the pass-band of one amplifier to a frequency range for which the isolation of the circulators exceeds the combined gain of both amplifiers.

Figure 6:
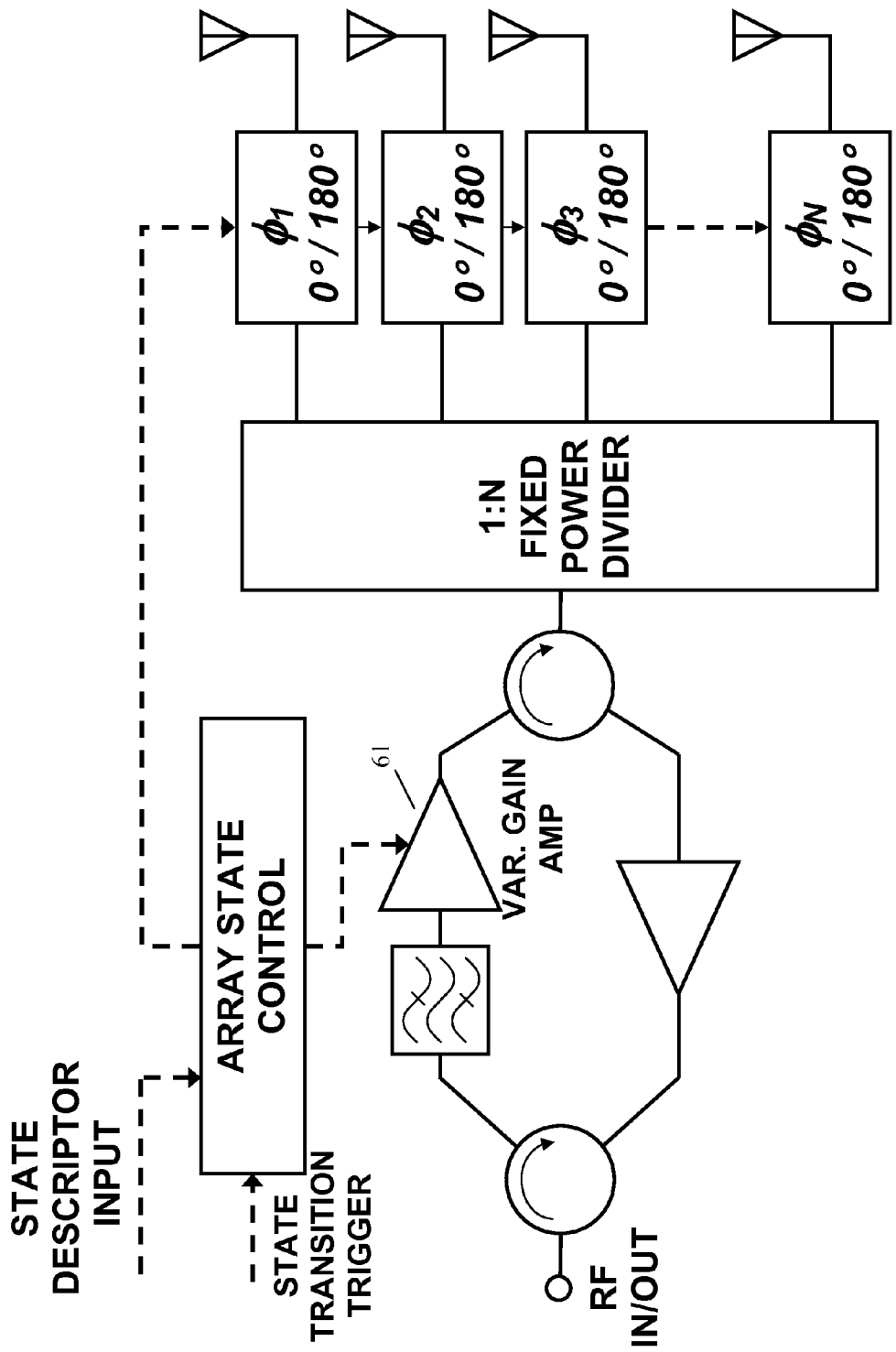
FIG. 6 shows a reader controller which can accept externally-generated inputs to specify the array state and to trigger the transition of the array between states.

A more advanced embodiment is shown in FIG. 6, suitable for use in conjunction with a reader controller that can be programmed to directly utilize and manage the array antenna system. Such a reader controller can be, for example, implemented with a microcomputer configured with appropriate interface cards for controlling and querying associated digital devices. Standard RFID reader protocols such as the EPCglobal Low Level Reader Protocol enable such computer-based control of RFID readers. A programmable controller can send commands to the reader to establish various parameters for an RFID read event, trigger the read event, and download the resulting tag-identification data from the reader. In addition to these tasks, a programmable reader controller can also access a list of preferred array states, stored within the controller or stored remotely, and command the array system to an appropriate state before triggering the RFID read event. After downloading the tag-identification data from the reader, the controller can update a database associating different array states with different numbers of tags successfully read with each state. As described above, this association data can reflect a number of tag ensembles, or be associated with a particular ensemble of tags. In addition, the embodiment of FIG. 6 shows a variable-gain RF amplifier 61 in the transmit path, enabling the power utilized for each array state to be optimized to maximize local electromagnetic field levels within the active read volume, subject to the applicable regulatory constraints on radiated emissions in the far field.

While FIGS. 5 and 6 show the amplification in path between the array and the reader, this function could be distributed among the various array elements. For example, transmit-receive modules ("T-R modules") such as those developed for radar applications could be used. In addition, control functions such as phase and amplitude control could be included within the T-R modules themselves.

Embodiments

Embodiment 1

An antenna system, comprising:
an RF input port, wherein the RF input port receives an input RF signal, wherein the input RF signal is suitable for reading at least one RFID tag;
a plurality of antennas capable of producing RF fields in a region of interest;
a means for producing a corresponding plurality of antenna input signals from the input RF signal, wherein each of the plurality of antenna input signals is suitable for reading the at least one RFID tag, wherein when the plurality of antenna input signals is inputted to the plurality of antennas a corresponding plurality of RF fields is produced in the region of interest;
a state controller, wherein the state controller changes a state of the plurality of antennas by altering the plurality of RF fields, wherein the state controller produces a first state during a first period of time and produces a second state during a second period of time, Embodiment 2

The system according to Embodiment 1, wherein the state controller alters the plurality RF fields by altering one or more of the following:
a phase of a first at least one of the plurality of antenna input signals,
a ratio of amplitudes of a second at least two of the plurality of antenna input signals,
a radiation pattern of a first at least one of the plurality of antennas, and
a polarization of a second at least one of the plurality of antennas.

Embodiment 3

The system according to Embodiment 1, wherein the means for producing a plurality of antenna input signals suitable for reading at least one of the RFID tag comprises a power divider, wherein the input RF signal is inputted to the power divider and the corresponding plurality of antenna input signals are outputted from the power divider.

Embodiment 4

The system according to Embodiment 1, wherein the state controller alters the plurality of RF fields by altering a phase of at least one of the plurality of antenna input signals.

Embodiment 5

The system according to Embodiment 1, wherein the state controller alters the plurality of RF fields by altering a ratio of amplitudes of at least two of the plurality of antenna input signals.

Embodiment 6

The system according to Embodiment 1, wherein the state controller alters the plurality of RF fields by altering a radiation pattern of at least one of the plurality of antennas.

Embodiment 7

The system according to Embodiment 1, wherein the state controller alters the plurality of RF fields by altering a polarization of at least one of the plurality of antennas.

Embodiment 8

The system according to Embodiment 1, further comprising:
an RFID reader, wherein the RFID reader is coupled to the RF input port and provides the input RF signal.

Embodiment 9

The system according to Embodiment 1, further comprising:
an RF receiver, wherein the RF receiver receives a return RF signal, wherein the return RF signal is due to the plurality of the RF fields being incident on one or more of the at least one RFID tag.

Embodiment 10

The system according to Embodiment 7, wherein the receiver comprises the plurality of antennas.

Embodiment 11

The system according to Embodiment 9, wherein the received return RF signal is from the RF input port.

Embodiment 12

The system according to Embodiment 8, further comprising:
an RF receiver, wherein the RF receiver receives a return RF signal, wherein the return RF signal is due to the plurality of the RF fields being incident on one or more of the at least one RFID tag.

Embodiment 13

The system according to Embodiment 12, wherein the received return RF signal is outputted from the RF input port to the RFID reader.

Embodiment 14

The system according to Embodiment 9, wherein the receiver comprises a second plurality of antennas.

Embodiment 15

The system according to Embodiment 14, further comprising:
a second state controller, wherein the second state controller changes a receive state of the second antenna array by altering one or more of the following:
a phase of a first at least one of a plurality of received return RF signals as received by the second plurality of antennas,
a ratio of amplitudes of at least two of the plurality of received return RF signals,
a radiation pattern of at least one of the second plurality of antennas, and
a polarization of one or more of the second plurality of antennas.

Embodiment 16

The system according to Embodiment 15, wherein the second state controller produces a first receive state during the first period of time and produces a second receive state during the second period of time.

Embodiment 17

The system according to Embodiment 8, further comprising:
one or more RFID tags located in a far-field region of the plurality of antennas.

Embodiment 18

The system according to Embodiment 17, wherein the far-field region is greater than or equal to $$\frac{2D^2}{\lambda},$$

where D is the largest dimension of an antenna in a plurality of antennas normal to radiation direction and $\lambda$ is the wavelength of the plurality of RF fields.

Embodiment 19

The system according to claim 8, further comprising:
one or more RFID tags located in a radiating near field of the plurality of antennas.

Embodiment 20

The system according to Embodiment 19, wherein the radiating near field is in the range $$3\lambda - \frac{2D^2}{\lambda},$$

where D is the largest dimension of an antenna in the plurality of antennas normal to radiation direction and $\lambda$ is the wavelength of the plurality of RF fields.

Embodiment 21

The system according to Embodiment 8, further comprising:
one or more RFID tags located greater than or equal to $3\lambda$ away from the plurality of antennas, where $\lambda$ is the wavelength of the plurality of RF fields.

Embodiment 22

The system according to Embodiment 8, further comprising:
one or more RFID tags located closer than $3\lambda$ away from the antenna array, where $\lambda$ is the wavelength of the transmitted RF signal.

Embodiment 23

The system according to Embodiment 4, wherein the state controller alters the phase of the at least one of the plurality of antenna input signals via a corresponding plurality of phase shifters, wherein each of the plurality of phase shifters receives a one of the plurality of antenna input signals and outputs the antenna input signal to the corresponding antenna.

Embodiment 24

The system according to Embodiment 1, wherein each antenna of the plurality of antennas is within $$\frac{\lambda}{2}$$

of another antenna of the plurality of antennas, where $\lambda$ is the wavelength of the plurality of RF fields.

Embodiment 25

The system according to Embodiment 1, wherein each antenna of the plurality of antennas is in a range of $$\frac{\lambda}{2}$$

to $\lambda$ away from a closest neighbor antenna of the plurality of antennas, where $\lambda$ is the wavelength of the plurality RF fields.

Embodiment 26

The system according to Embodiment 1, wherein each antenna of the plurality of antennas is greater than $\lambda$ away from a closest neighbor antenna of the plurality of antennas, where $\lambda$ is the wavelength of the plurality of RF fields.

Embodiment 27

The system according to Embodiment 6, wherein altering the radiation pattern of the at least one of the plurality of antennas comprises altering a beam shape of the at least one of the plurality of antennas.

Embodiment 28

The system according to Embodiment 6, wherein altering the radiation pattern of the at least one of the plurality of antennas comprises altering a beam pointing angle of the at least one of the plurality of antennas.

Embodiment 29

The system according to Embodiment 1, wherein at least two of the same antennas from the plurality of antennas produce one of the plurality of RF fields in the first state and the second state.

Embodiment 30

The system according to Embodiment 1, wherein the plurality of antennas comprises at least four antennas.

Embodiment 31

A method of reading one or more RFID tags, comprising:
positioning one or more RFID tags in a region of interest;
positioning a plurality of antennas, wherein the plurality of antennas is capable of producing RF fields in the region of interest;
receiving an input RF signal, wherein the input RF signal is suitable for reading at least one of the one or more RFID tags;
producing a corresponding plurality of antenna input signals from the received input RF signal, each of the plurality of antenna input signals suitable for reading at least one of the one or more RFID tags;
inputting each of the plurality of antenna input signals into a corresponding antenna of the plurality of antennas, such that a corresponding plurality of RF fields are simultaneously produced in the region of interest from the plurality of antennas while the plurality of RF fields are in a first state during a first period of time;
receiving a first return RF signal, wherein the first return RF signal is due to the plurality of RF fields produced during the first period of time being incident on the at least one of the one or more RFID tags;
processing the first return RF signal to determine whether the at least one of the one or more RFID tags is present in the region of interest;
inputting each of the plurality of antenna input signals into the corresponding antenna of the plurality of antennas, such that the corresponding plurality of RF fields are simultaneously produced in the region of interest from the plurality of antennas while the plurality of RF fields are in a second state during a second period of time, wherein the second state is accomplished by altering the plurality of RF fields produced in the region of interest;
receiving a second return RF signal, wherein the second return RF signal is due to the plurality of RF fields produced during the second period of time being incident on the at least one of the one or more RFID tags;
processing the second return RF signal to determine whether the at least one of the one or more RFID tags is present in the region of interest.

Embodiment 32

The method according to Embodiment 31, wherein altering at least one of the plurality of RF fields produced in the region of interest comprises one or more of the following:
altering a phase of a first at least one of the plurality of antenna input signals,
altering a ratio of amplitudes of a second at least two of the plurality of antenna input signals,
altering a radiation pattern of a at least one of the plurality of antennas, and
altering a polarization of a second at least one of the plurality of antennas.

Embodiment 33

The method according to Embodiment 31, wherein altering at least one of the plurality of RF fields produced in the region of interest comprises altering a phase of at least one of the plurality of antenna input signals.

Embodiment 34

The method according to Embodiment 31, wherein altering at least one of the plurality of RF fields produced in the region of interest comprises altering a ratio of amplitudes of at least two of the plurality of antenna input signals.

Embodiment 35

The method according to Embodiment 31, wherein altering at least one of the plurality of RF fields produced in the region of interest comprises altering a radiation pattern of at least one of the plurality of antennas.

Embodiment 36

The method according to Embodiment 31, wherein altering at least one of the plurality of RF fields produced in the region of interest comprises altering a polarization of at least one of the plurality of antennas.

Embodiment 37

The method according to Embodiment 31, further comprising:
a) inputting each of the plurality of antenna input signals into the corresponding antenna of the plurality of antennas, such that the corresponding plurality of RF fields are simultaneously produced in the region of interest from the plurality of antennas while the plurality of antennas are in at least one additional state during at least one additional period of time; and b) receiving at least one additional return RF signal, wherein the at least one additional return RF signal is due to the plurality of RF fields produced during the at least one additional period of time being incident on the at least one of the one or more RFID tags, wherein the at least one additional state is accomplished by altering the plurality of RF fields produced in the region of interest;

c) processing the at least one additional return RF signal to determine whether the at least one of the one or more RFID tags is present in the region of interest.

Embodiment 38

The method according to Embodiment 37, further comprising:
Repeating a, b, and c until a criterion is met.

Embodiment 39

The method according to Embodiment 39, wherein the criterion is all of the one or more RFID tags in the region of interest are present.

Embodiment 40

The method according to Embodiment 39, wherein the criterion is all states have been utilized.

Embodiment 41

The method according to Embodiment 39, wherein the criterion is a certain time period has passed.

Embodiment 42

The method according to Embodiment 39, wherein the criterion is a termination signal is received.

Embodiment 43

The method according to Embodiment 31, wherein receiving the first return RF signal and receiving the second return RF signal is accomplished via an RF receiver.

Embodiment 44

The method according to Embodiment 43, wherein the RF receiver comprises the plurality of receivers.

Embodiment 45

The method according to Embodiment 43, wherein the RF receiver comprises a second plurality of antennas.

Embodiment 46

The method according to Embodiment 31, wherein receiving the input RF signal comprises receiving the input RF signal from an RFID reader.

Embodiment 47

The method according to Embodiment 46, further comprising:
inputting the first return RF signal to the RFID reader; and
inputting the second return RF signal to the RFID reader.

Embodiment 48

The system according to Embodiment 4, wherein altering the phase of at least one of the plurality of antenna input signals is achieved by at least one variable time-delay.

Embodiment 49

The system according to Embodiment 2, wherein altering the plurality of RF fields comprises using control elements controlled by analog voltages that are generated by analog oscillator circuits.

Embodiment 50

The method according to Embodiment 31, wherein possible states are ordered to place states having a statistically higher probability of successfully reading tags earlier in the ordering.

Embodiment 51

The method according to Embodiment 31, wherein possible states are ordered to place array states with a proven history of successfully reading tags earlier in the ordering.

Embodiment 52

The method according to Embodiment 50, wherein the probability of successfully reading tags applies to a specific ensemble of tags in a fixed configuration.

Embodiment 53

The method according to Embodiment 50, wherein the proven history of successfully reading tags applies to a specific ensemble of tags in a fixed configuration.

Embodiment 54

The method according to Embodiment 50, wherein the probability of successfully reading tags applies to a category of ensembles.

Embodiment 55

The method according to Embodiment 50, wherein the proven history of successfully reading tags applies to a category of ensembles.

Embodiment 56

The method according to Embodiment 31, wherein possible states are defined as a set of all possible combinations of digital commands to various electronic control elements.

Embodiment 57

The method according to Embodiment 56, wherein the states have been ordered so that all possible permutations of the most-significant bits of various digital commands are cycled through first.

Embodiment 58

The method according to Embodiment 31, wherein data from the RFID reader and/or a controller of the RFID reader is monitored to detect reports of newly identified tags, wherein an interval between successive new tag identifications is calculated from detections, and wherein the state is changed when the interval between new tag identifications is longer than a specified threshold.

Embodiment 59

The method according to Embodiment 31, wherein transmissions of the RFID reader are monitored and processed, and wherein signal features from the transmissions such as burst durations, signal gaps, and frequency hops are used to ascertain the status of the reader with respect to the reader's read cycles.

Embodiment 60

The method according to Embodiment 59, wherein the signal features are utilized to time state transitions so as to avoid corruption of individual read cycles.

Consistent with the various descriptions and discussions within this document, numerous variations on these example embodiments are possible, while remaining within the spirit and intent of the invention.

Though many specific design details have been omitted from the descriptions and embodiments disclosed herein, in the hands of practitioners skilled in the relevant arts the information disclosed is quite sufficient to enable the engineering and construction of practical, working devices.

In specific embodiments, a variety of techniques can be used to control and operate the subject device. Control elements are controlled by analog voltages that are generated by digitally controlled circuits such as digital-to-analog converters. Active electronics modules are associated with one or more of the individual array elements. One or more antennas can transmit signals that have been digitally encoded and reconstructed, for example with analog-to-digital converters and digital-to-analog converters. One or more control functions, such as phase and amplitude, an be implemented numerically at a point where the signals are still in digital format. The device can incorporate a receiver and processor to monitor an RFID reader's transmissions, and use signal features such as burst durations, signal gaps and frequency hops to ascertain the status of the reader with respect to its read cycles, and use this information to time array state transitions so as to avoid corruption of individual read cycles. The device can incorporate a data link from a computer or controller that is receiving data from the RFID, along with programming to calculate the intervals between new reports of tags successfully identified, and compare one or more intervals to a specified threshold, and command the array to a new stated when some determined number of intervals exceeds the specified threshold.

An embodiment of the subject device can also incorporate an interface module providing multiple antenna ports, where the interface module detects the incident radio-frequency power in each of the antenna ports, and a radio-frequency signal switch that selectively connects the radio-frequency signal port of the antenna array system to any one of the various antenna ports, together with logic to interpret the detections of incident radio-frequency power, together with means to control said radio-frequency signal switch according to this logic. The logic can determine when an external radio-frequency signal source such as a radio-frequency-identification reader has changed from exciting one of the antenna ports to exciting a different antenna port. In response to this change, the interface module can trigger the antenna array system to transition from the current array state to the next array state in the defined sequence of array states, and can also connect the radio-frequency signal port to the newly excited antenna port via said radio-frequency signal switch.

Embodiments can have separate radio-frequency signal channels for transmitted and received signals. Transmitted signals can be defined as signals input at the radio-frequency signal port and conveyed by the antenna array system to its various antenna elements and received signals can be defined as signals incident on one or all of the various antenna elements and conveyed to the radio-frequency signal port by the antenna array system. Radio-frequency amplification may be incorporated into either or both said radio-frequency signal channels to boost the power level of transmitted signals, received signals or both transmitted and received signals.

Embodiments can allow resetting of the array to the initial state in its defined sequence of states. The stepped through the entire defined sequence of array states, wherein the reset operation may be in response to a command accepted as an input to the antenna array system, or may be executed automatically by the antenna array system if no transitions in array states are executed for some predetermined interval of time. The defined sequence of array states can be ordered so the antenna array system steps through preferred array states earlier in said defined sequence and through less preferred array states later in the defined sequence, wherein the degree of preference for a given state is determined by measured, calculated, predicted or expected superiority or adequacy in performance for a given application.

In an embodiment, one or more elements of the ensemble of antennas can have electrically or electronically controllable properties such as beam pointing angle, beam shape, or electromagnetic polarization, and each array state of said antenna array system can have a unique combination of the transfer functions and controllable properties of individual elements within said ensemble of antennas.

In specific embodiments, detectors can be used to measure or monitor the radiated electromagnetic field at strategic locations in the vicinity of the array system, together with means to adjust the input power to said array system for each array state so as to maintain a defined constraint on the radiated field as measured or monitored at the strategic locations can be provided.

Means to adjust the gain of said radio-frequency amplification means so as to maintain a defined constraint on the radiated field as measured or monitored at the strategic locations can be provided.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed:

1. A non-transitory, computer readable medium containing a set of instructions that when executed cause a computer to perform a method of reading one or more RFID tags, wherein the method comprises:
    positioning one or more RFID tags in a volume of interest;
    positioning a plurality of antennas, wherein each antenna of the plurality of antennas is configured to produce an RF field in the volume of interest when an antenna input signal is inputted to the each antenna of the plurality of antennas, wherein one or more antenna of the plurality of antennas is configured to produce an RF field at any position in the volume of interest;

receiving an input RF signal, wherein the input RF signal is suitable for reading at least one of the one or more RFID tags;

producing a corresponding plurality of antenna input signals from the received input RF signal, each of the plurality of antenna input signals suitable for reading the at least one of the one or more RFID tags;

inputting each of the plurality of antenna input signals into a corresponding antenna of the plurality of antennas while the plurality of antennas is in a first state during a first period of time, such that a corresponding first plurality of RF fields is simultaneously produced in the volume of interest from the plurality of antennas;

receiving a first receive RF signal, wherein the first receive RF signal is due to the first plurality of RF fields produced during the first period of time being incident on the at least one of the one or more RFID tags;

processing the first receive RF signal to determine whether the at least one of the one or more RFID tags is present in the volume of interest;

inputting each of the plurality of antenna input signals into the corresponding antenna of the plurality of antennas while the plurality of antennas is in a second state during a second period of time, such that a corresponding second plurality of RF fields is simultaneously produced in the volume of interest from the plurality of antennas, wherein the second plurality of RF fields produced in the region of interest is altered compared with the first plurality of RF fields produced in the volume of interest;

receiving a second receive RF signal, wherein the second receive RF signal is due to the plurality of RF fields produced during the second period of time being incident on the at least one of the one or more RFID tags;

processing the second receive RF signal to determine whether the at least one of the one or more RFID tags is present in the volume of interest, wherein the second plurality of RF fields produced in the volume of interest is altered as compared to the first plurality of RF fields produced in the volume of interest via one or more of the following:

altering a phase of a first at least one of the plurality of antenna input signals, wherein altering the phase of the first at least one of the plurality of antenna input signals is independent of altering a phase of any other of the plurality of antenna input signals, altering a ratio of amplitudes of a first at least two of the plurality of antenna input signals, altering a radiation pattern of a first at least one of the plurality of antennas, and altering a polarization of a second at least one of the plurality of antennas.

2. The medium according to claim 1, wherein the second plurality of RF fields produced in the volume of interest is altered as compared to the first plurality of RF fields produced in the volume of interest by altering a phase of at least one of the plurality of antenna input signals.

3. The medium according to claim 1, wherein the second plurality of RF fields produced in the volume of interest is altered as compared to the first plurality of RF fields produced in the volume of interest by altering a ratio of amplitudes of at least two of the plurality of antenna input signals.

4. The medium according to claim 1, wherein the second plurality of RF fields produced in the volume of interest is altered as compared to the first plurality of RF fields produced in the volume of interest by altering a radiation pattern of at least one of the plurality of antennas.

5. The medium according to claim 1, wherein the second plurality of RF fields produced in the volume of interest is altered as compared to the first plurality of RF fields produced in the volume of interest by altering a polarization of at least one of the plurality of antennas.

6. The medium according to claim 1, further comprising:

a) inputting each of the plurality of antenna input signals into the corresponding antenna of the plurality of antennas while the plurality of antennas are in at least one additional state during at least one additional period of time, such that a corresponding at least one additional plurality of RF fields are simultaneously produced in the volume of interest from the plurality of antennas;

b) receiving at least one additional receive RF signal, wherein the at least one additional receive RF signal is due to the at least one additional plurality of RF fields produced during the at least one additional period of time being incident on the at least one of the one or more RFID tags, wherein each of the at least one additional plurality of RF fields produced in the volume of interest is altered as compared with the first plurality of RF fields, is altered as compared with the second plurality of RF fields, and is altered as compared with each of the other at least one additional plurality of RF fields produced in the volume of interest; and c) processing the at least one additional receive RF signal to determine whether the at least one of the one or more RFID tags is present in the volume of interest.

7. The medium according to claim 6, further comprising: repeating a, b, and c until a criterion is met.

8. The medium according to claim 6, wherein the criterion is all of the one or more RFID tags in the volume of interest are present.

9. The medium according to claim 8, wherein the criterion is all of the states of at least one additional state have been utilized.

10. The medium according to claim 8, wherein the criterion is a certain time period has passed.

11. The medium according to claim 8, wherein the criterion is a termination signal is received.

12. The medium according to claim 1, wherein receiving the first receive RF signal and receiving the second receive RF signal is accomplished via an RF receiver.

13. The medium according to claim 12, wherein the RF receiver comprises the plurality of antennas.

14. The medium according to claim 12, wherein the RF receiver comprises a second plurality of antennas.

15. The medium according to claim 1, wherein receiving the input RF signal comprises receiving the input RF signal from an RFID reader.

16. The medium according to claim 15, further comprising:
    inputting the first receive RF signal to the RFID reader; and
    inputting the second receive RF signal to the RFID reader.

17. The medium according to claim 6, wherein the first state, second state, and the at least one additional state are ordered to place states having a statistically higher probability of successfully reading tags earlier in the ordering.

18. The medium according to claim 6, wherein the first state, second state, and the at least one additional state are ordered to place array states for which RFID tags have been successfully read earlier in the ordering.

19. The medium according to claim 17, wherein the probability of successfully reading tags applies to a specific ensemble of tags in a fixed configuration.

20. The medium according to claim 18, wherein the RFID tags that have been successfully read comprise a specific ensemble of tags in a fixed configuration.

21. The medium according to claim 19, wherein the probability of successfully reading tags applies to a category of ensembles.

22. The medium according to claim 20, wherein the proven history of successfully reading tags applies to a category of ensembles.

23. The medium according to claim 6, wherein one or more electronic control elements are used to alter the plurality of RF fields produced in the volume of interest in order to change the plurality of antennas from one of: the first state, the second state, and the at least one additional state, to another of: the first state, the second state, and the at least one additional state, wherein digital commands are provided to the electronic control elements to alter the plurality of RF fields produced in the volume of interest, wherein the first state, the second state, and the at least one additional state include all possible states, wherein possible states correspond to possible combinations of digital commands that can be provided to the electronic control elements.

24. The medium according to claim 23, wherein one or more electronic control elements are used to alter the plurality of RF fields produced in the volume of interest in order to change the plurality of antennas from one of: the first state, the second state, and the at least one additional state, to another of: the first state, the second state, and the at least one additional state, wherein digital commands are provided to the electronic control elements to alter the plurality of RF fields produced in the volume of interest, wherein the first state, the second state, and the at least one additional state are ordered so that all possible permutations of the N most-significant bits of the digital commands are cycled through first, where N is an integer.

25. The medium according to claim 16, wherein data from the RFID reader and/or a controller of the RFID reader is monitored to detect reports of newly identified tags, wherein an interval between successive new tag identifications is calculated from detections, and wherein the state of the plurality of antennas is changed when the interval between new tag identifications is longer than a specified threshold.

26. The medium according to claim 16, wherein transmissions of the RFID reader are monitored and processed, and wherein signal features from the transmissions such as burst durations, signal gaps, and frequency hops are used to ascertain the status of the reader with respect to the reader's read cycles.

27. The medium according to claim 26, wherein the signal features are utilized to time state transitions so as to avoid corruption of individual read cycles.

28. The medium according to claim 1, wherein at least the first receive RF signal or the second receive RF signal has a higher intensity than a third receive RF signal due to an RF field produced in the volume of interest being incident on the at least one of the one or more RFID tags, wherein the RF field is produced upon inputting the input RF signal to any one of the plurality of antennas.

29. The medium according to claim 1, wherein for at least one location in the volume of interest each antenna of the plurality of antennas is configured to produce an RF field at the at least one location in the volume of interest.

30. The medium according to claim 1, wherein each antenna of the plurality of antennas is configured to produce an RF field at any position in the volume of interest.

31. The medium according to claim 1, further comprising:
positioning one or more auxiliary receive antennas in the volume of interest,
sensing a far-field electromagnetic field intensity of the plurality of RF fields in real time via the one or more auxiliary receive antennas,
adjusting a magnitude of transmitted power from the plurality of antennas in real time based on the far-field electromagnetic field intensity sensed by the one or more auxiliary receive antennas.

* * * * *

UNITED STATES PATENT AND TRADEMARK OFFICE
CERTIFICATE OF CORRECTION

PATENT NO. : 8,952,815 B2  Page 1 of 1
APPLICATION NO. : 14/085294
DATED : February 10, 2015
INVENTOR(S) : Mark H. Smith It is certified that error appears in the above-identified patent and that said Letters Patent is hereby corrected as shown below:

In the Specification

Column 4,
Line 26, "$\{j\gamma_n\}$," should read --$\{j\tilde{\gamma}_n\}$,--.

Line 45, "$\Sigma_{n=1}^{N}$" should read -- $\sum_{n=1}^{N}$ --.

Signed and Sealed this
Twenty-second Day of September, 2015

Michelle K. Lee
*Director of the United States Patent and Trademark Office*